Dec. 1, 1959 K. C. BUGG 2,915,727
CASING FOR VARIABLE IMPEDANCE ELECTRICAL COMPONENT
Filed Feb. 6, 1958 2 Sheets-Sheet 1

INVENTOR.
Kenly C. Bugg,
BY
Byron, Hume, Groen + Clement
ATTYS

Dec. 1, 1959
K. C. BUGG
2,915,727
CASING FOR VARIABLE IMPEDANCE ELECTRICAL COMPONENT
Filed Feb. 6, 1958
2 Sheets-Sheet 2
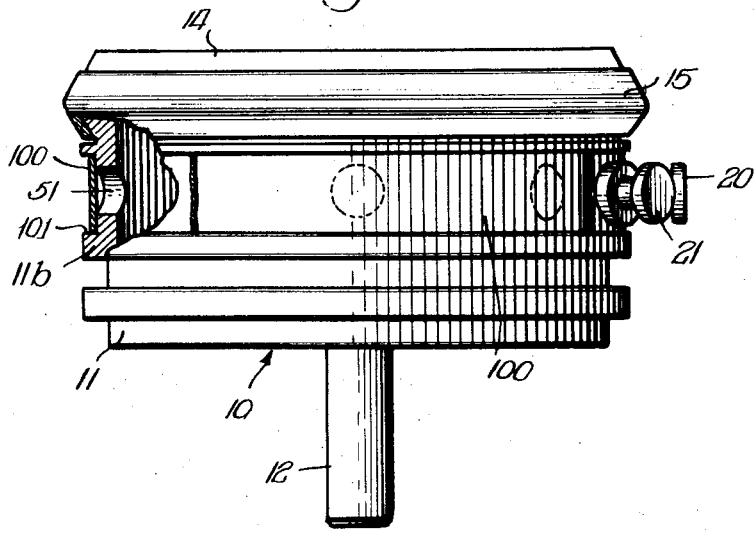
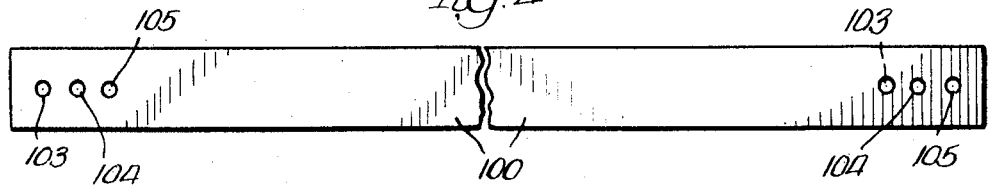
INVENTOR.
Kenly C. Bugg,
BY

United States Patent Office 2,915,727
Patented Dec. 1, 1959

2,915,727

CASING FOR VARIABLE IMPEDANCE ELECTRICAL COMPONENT

Kenly C. Bugg, Fort Wayne, Ind., assignor to Kendick Manufacturing Company, Inc., Fort Wayne, Ind., a corporation of Indiana Application February 6, 1958, Serial No. 713,686

9 Claims. (Cl. 338—184)

The present invention relates to variable impedance electrical components and particularly to an improved casing for enclosing the impedance elements of such components.

In usage, and particularly in military usage, electrical components must be adaptable to a wide variety of environmental conditions without being subjected to any change in electrical characteristics. In variable impedance electrical components such as a variable resistance, a variable inductance, a variable capacitance, etc., provided with a rotor shaft for varying the impedance, one environmental condition that is particularly damaging to the characteristics is that of heat and high humidity. During use in such an atmosphere, the variable impedance component has a tendency to draw into the casing through the rotor shaft and the bearing assembly therefor and through the cover for the casing a considerable amount of moisture which does influence the electrical characteristics of the component. Inasmuch as it is not possible to hermetically seal a unit of this type and thereby avoid the problem of moisture, it is desirable that some provision be made especially in such components, particulary those of the precision type, for rapidly exhausting moisture from the interior of the casing, and for rapidly drying the conductive elements thereof.

It is a general object of the present invention to provide an improved casing for variable impedance electrical components such as a potentiometer and the like, which will permit aeration and rapid evaporation of accumulated moisture from the casing without at the same time providing a means for dust, moisture and the like to enter the cavity of the control instrument.

A specific object of the invention is to provide an improved casing for variable impedance electrical components having a peripheral groove on the outer surface thereof, at least one aperture in the casing communicating between the interior and the exterior thereof and terminating at the exterior within the confines of the peripheral groove, and a resilient reed of impervious material coextensive with and positioned in the groove contiguous to the inner wall of the groove and overlying the apertures, thereby forming with a casing a valve arrangement which will permit moisture to be exhausted and evaporated from the interior of the casing and which otherwise seals the apertures from a reverse flow of moisture and dirt laden dust into the casing.

The invention, both as to its structure and manner of use, will be better understood from the following description and from the drawings, forming a part thereof relating to the invention as utilized with a potentiometer assembly, wherein:

Figure 3 is a side view of the potentiometer casing in accordance with the invention with a portion thereof broken away to show the details of the valve structure; and Figure 4 is a plan view of the valve reed employed in the potentiometer casing of the invention.

Figure 1:
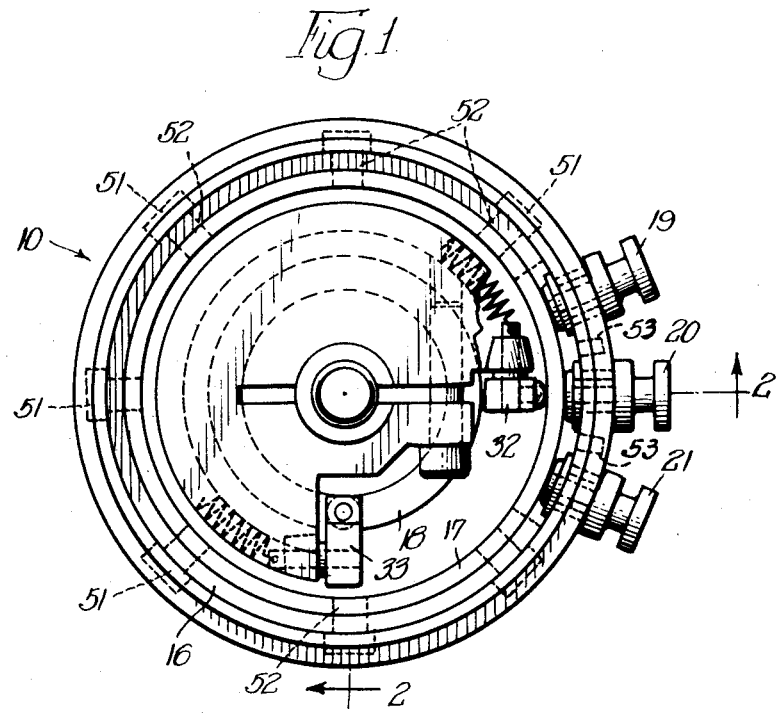
Figure 1 is a top plan view of a potentiometer assembly including a casing in accordance with the present invention.
Figure 2:
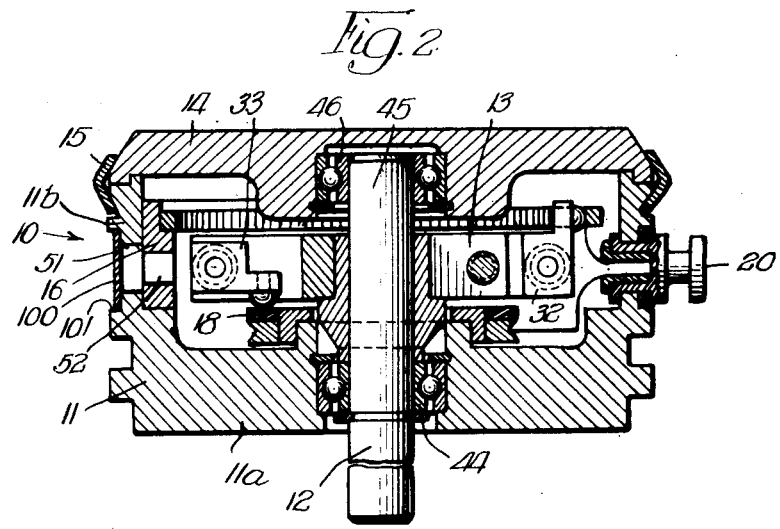
Figure 2 is an expanded sectional side view of the potentiometer assembly taken along the lines 2—2 of Figure 1.

Referring to the drawings, the precision potentiometer structure shown in Figures 1 and 2 is substantially identical to that potentiometer structure disclosed in the applicant's co-pending application, Serial No. 674,145, filed July 25, 1957. The representation of Figure 1 is a top plan view of the potentiometer assembly with the top cover member thereof and the clamp ring for securing the cover to the main potentiometer casing removed. Figure 2 is a side view in section taken along lines 2—2 of Figure 1 and including the top cover member thereof and the clamp ring for securing the cover to the main potentiometer casing. The potentiometer 10 shown in Figures 1 and 2 includes a cylindrical casing 11 having a bottom wall 11a and a circular side wall 11b, a shaft 12 mounted in and supported in the bottom wall 11a for rotation by means of a bearing assembly 44, a rotor 13 secured to the shaft 12 and rotatable therewith, and a cover 14 fitted to the side wall 11b at the open end of the casing 11 and secured thereto by means of a clamp ring 15. A liner of insulating material 16 is positioned on the inner surface of the side wall 11b and carries thereon a resistance coil 17. A conductive slip ring 18 is carried within the lower confines of the casing 11 insulated from the casing. Projecting through the side wall 11b of the cylindrical casing is a set of three terminals 19, 20, and 21, each of which is made of conductive material and is insulated from the side wall 11b. Two of the terminals, such as the terminals 19 and 20, are connected respectively to the ends of the resistance coil 17 and the other terminal, such as the terminal 21, is connected to the slip ring 18.

A rotor 13 is fixed to the shaft 12 and is a disc of substantially circular configuration arranged to carry at positions spaced thereon a brush assembly 32 adapted to make contact with the resistance coil 17 and a brush assembly 33 adapted to make contact with the slip ring 18. The end 45 of the shaft 12 is supported in the cover 14 of the casing by means of a bearing assembly 46.

As best shown in Figures 2 and 3 the casing 11 includes in the outer surface of the side wall 11b a peripheral groove 101 of a constant depth. Extending through the side wall 11b of the casing and terminating within the peripheral groove 101 are a plurality of apertures 51 communicating between the interior and the exterior of the casing 11. Cooperating apertures 52 are also included in the insulating liner 16 for providing better communication between the central interior of the casing and the exterior. Positioned within the groove 101 is a resilient reed 100 of substantially impervious material and which is further characterized as having a broad thermo range of elasticity. Specifically, the reed should be flexible over a broad range of temperatures commensurate with the environmental conditions to which the potentiometer assembly is subjected and should be adapted so that under certain pressure conditions it can expand away from the apertures 51 and under other pressure conditions close itself tightly to the apertures 51. Examples of materials adaptable to such a use as polyethylene, tetrafluoroethylene, aluminum, etc.

As shown in the drawing, the reed is chosen to be of a width wider than that of the apertures 51 and of substantially the same width as the groove 101. Preferably, the reed 100 is chosen to be of a length sufficient to overlie all of the aperture 51 in the periphery of the wall 11b and for convenience and simplicity in assembly is made to be of a length so that it overlaps itself in the area of the taps 19, 20 and 21. Specifically, in the preferred arrangement the reed 100 is provided at its respective ends with pairs of holes 103, 104 and 105 through which the terminals 19, 20 and 21, respectively, project into the casing. Thus, the reed 100 is fixed to the casing by means of the mentioned terminals. It is understood, of course, that instead of using one continuous reed such as that shown in Figure 4, the reed may be made up of a plurality of individual sections each of a width and length greater than that of any one of the apertures 51 and appropriately secured to the casing in the groove 101 to overlie the aperture.

To provide additional communicating areas between the interior and exterior of the casing, additional apertures 53 may be provided in the side wall 11a of the casing 11 between the terminal posts 19 and 20 and between the terminal posts 20 and 21.

Considering now the manner in which the potentiometer assembly is used and assuming connection of the potentiometer in an electric circuit with a source of potential connected to the terminals 19 and 20, a linearly progressive voltage drop is experienced in the resistance coil 17 between the terminals 19 and 20. A circuit is completed from the coil 17 through the brush assembly 32, a rotor 13, the brush assembly 33 and the side ring 18 to the terminal 21. Accordingly, the terminal 21 will be at a selected potential with regards to that of the terminal 19 and at a selected potential with regards to the terminal 20 and the potential at the terminal 21 and either one of the terminals 19 and 20 may be varied by rotating the shaft 12 so as to cause the rotor 13 and the brush assemblies 32 and 33 carried thereby to be rotated therewith. Upon rotation, the brush assembly 32 makes successive contact with different points of linearly progressive potentials on the resistance coil 17 which potentials appear on the terminal 21. Upon selection of the desired potential at the terminal 21, the shaft 12 may be locked in a fixed position by means not shown but considered to be well known in the art.

Under normal operating conditions and in the absence of a pressure in the potentiometer casing greater than the external pressure, the reed 100 seated contiguous to the inner wall of the groove 101 seals itself around the edges of the apertures 51 and effectively closes the aperture to any influx of air, moisture, dirt, etc. However, assuming that the potentiometer is being operated in an environment of high humidity and heat, there will be a tendency for moisture to be drawn into the casing through the bearing assembly 44 around the shaft 12 and through the juncture at which the cover 14 is joined to the casing 11. During operation the moisture so drawn into the casing is not likely to condense on the brushes, ring or coil so that the presence of such moisture will have little influence on the electrical characteristics of the potentiometer. Should the environmental conditions be changed, as by the potentiometer itself being displaced to a new environmental atmosphere such as is commonly experienced in aircraft, or as by the equipment being rendered non-operative so that the heat associated with the operation of the electrical circuit is dispersed, the moisture so collected will tend to condense on the operating elements of the potentiometer. This can cause serious disruptions in the electrical characteristics of the potentiometer and is to be avoided.

The change of environmental conditions produces a circumstance wherein heat and moisture is captivated within the casing, generally the pressure within the casing greater than that on the exterior of the casing. This pressure is exerted on the inner surface of the reed 100 through the aperture 51 and will cause the reed 100 to displace itself from the apertures thereby permitting the pressures within the interior of the casing to exhaust against the inner surface of the reed 100 and to condense and evaporate the moistures carried thereby on that inner surface. The displacement of the reed 100 from the aperture 51 will be slight in any circumstance and controlled in large measure by the thermo gradient operative between the outer and inner surfaces of the reed. Inasmuch as the casing includes a plurality of apertures 51, the expelling of the pressure and moisture will be relatively rapid and the aeration effective thereby will also cause the potentiometer to be quickly cooled.

It will be noted that the reed acts in combination as a "discharge" or a reed valve seal and as an evaporator surface that permits moisture that may be inside the assembly to wet the reed and spill out by virtue of the reed being on the outside of the housing, and at the same time the reed prevents dirt and dust from entering into the potentiometer. With this configuration, pressure from the outside cannot enter the potentiometer assembly but pressure from the inside can be expelled.

In view of the foregoing, it is appreciated that there has been provided herein an improved casing structure which though explained in terms of a potentiometer assembly may be employed with any variable impedance electrical component and which will permit the easy and rapid expelling of moisture accumulated therein. As a matter of comparison, it has been found that as between potentiometers not provided with this improved structure and potentiometers provided with this improved structure, the potentiometers having the latter structure will evaporate dry and free of moisture in approximately one-twentieth ($\frac{1}{20}$) of the time necessary to dry and free from moisture a potentiometer of the former construction. Accordingly, a primary advantage of the present improved electrical component casing arrangement is that it quickly recovers from otherwise crippling circumstances caused by environmental operation and thereby places electrical circuit in which it is effective, ready and able to function at all times and in all circumstances.

Although the arrangement disclosed herein is at present considered to be preferred, it is understood that variations and modifications may be made therein without departing from the spirit or scope of the invention and it is intended to cover in the appended claims all such modifications as fall within the true spirit and scope of the invention.

What is claimed is:

1. In a variable impedance electrical component including an impedance element and means for varying the impedance of the element; a hollow casing enclosing the impedance element comprising a cavity shaped body portion and a cover portion therefor, a primary aperture in said casing through which said impedance varying means is operated, a secondary aperture in said casing communicating between the interior and the exterior thereof, and a pressure release valve associated with said secondary aperture operative for expelling pressures within said casing, whereby moisture and air pressure accumulated in said casing through said primary aperture by environmental operation of the component are exhausted through said secondary aperture and said valve.

2. In a variable impedance electrical component including an impedance element and means for varying the impedance of the element; a hollow casing enclosing the impedance element comprising a cavity shaped body portion and a cover portion therefor, a primary aperture in said casing through which the impedance varying means is exteriorally extended and operated, a secondary aperture in said casing communicating between the interior and the exterior thereof, and a unidirectional pressure release valve associated with said secondary aperture at the exterior of said casing operative for expelling pressures within said casing, whereby moisture and air pressure accumulated in said casing through said primary aperture by environmental operation of the component are exhausted through said secondary aperture and said valve.

3. In a variable impedance electrical component including an impedance element and means for varying the impedance of the element; a hollow casing enclosing the impedance element comprising a cavity shaped body portion and a cover portion therefor, a primary aperture in said casing through which the impedance varying means is exteriorly extended and operated, a secondary aperture in said casing communicating between the interior and the exterior thereof, a resilient reed, and means for supporting said resilient reed on the exterior surface of said casing in covering relationship with said secondary aperture for alternately discharging therethrough pressures occurrent at the interior of said casing and blocking passage therethrough of pressures occurrent at the exterior of said casing, whereby moisture and air pressure accumulated in said casing through said primary aperture by environmental operation of the component are exhausted through said secondary aperture by action on said resilient reed.

4. In a variable impedance electrical component including an impedance element and means for varying the impedance of the element; a hollow casing enclosing the impedance element and the impedance varying means comprising a cavity shaped body portion and a cover portion therefor, a primary aperture in said casing through which the impedance varying means is exteriorly extended and operated, a secondary aperture in said casing communicating between the interior and the exterior thereof, a shallow groove in the exterior surface of said casing at the periphery of said secondary aperture, and a resilient reed positioned in said groove contiguous to the innermost wall of said groove in order to valve said secondary aperture for alternately exhausting therethrough pressures occurrent at the interior of said casing and blocking passage therethrough of pressures occurrent at the exterior of said casing, whereby moisture and air pressure accumulated in said casing through said primary aperture by environmental operation of the component are exhausted through said secondary aperture by action on said resilient reed.

5. In a variable impedance electrical component including an impedance element and means for varying the impedance of the element; a hollow casing enclosing the impedance element and the impedance varying means comprising a cavity shaped body portion and a cover portion therefor, a primary aperture in said casing through which the impedance varying means is exteriorally extended and operated, a shallow peripheral groove in the exterior surface of said casing, a plurality of secondary apertures in said casing communicating between the interior and the exterior thereof terminating within the confines of said shallow peripheral groove, and a resilient reed coextensive with and positioned in said groove contiguous to the innermost wall of said groove overlying said secondary apertures, said resilient reed being of a substantially impervious material so as to be displaced from said secondary apertures responsive to a relative pressure thereon at its interior surface through said apertures and so as to be sealed to said second aperture responsive to a relative pressure thereon at its exterior surface, whereby moisture and air pressure accumulated in said casing as through said primary aperture and said cover portion during environmental operation of the component are exhausted through said secondary apertures by action on said resilient reed and the moisture is evaporated at the innermost surface of said groove and at the interior surface of said reed.

6. The casing set forth in claim 5 wherein said resilient reed is of a material characterized as having a broad thermal range of elasticity.

7. The casing set forth in claim 6 wherein said resilient reed is of aluminum metal.

8. In a variable impedance electrical component including an impedance element and means for varying the impedance of the element; a hollow casing enclosing the impedance element and the impedance varying means comprising a cavity shaped body portion and a cover portion therefor, a primary aperture in said casing through which the impedance varying means is exteriorally extended and operated, a shallow peripheral groove in the exterior surface of said casing, a plurality of secondary apertures in said casing communicating between the interior and the exterior thereof terminating within the confines of said shallow peripheral groove, and a resilient reed coextensive with and positioned in said groove contiguous to the innermost wall of said groove overlying said secondary apertures, said resilient reed being of polyethylene material characterized as having a broad thermal range of elasticity so as to be displaced from said secondary apertures responsive to a relative pressure thereon at its interior surface through said apertures and so as to be sealed to said second aperture responsive to a relative pressure thereon at its exterior surface, whereby moisture and air pressure accumulated in said casing as through said primary aperture and said cover portion during environmental operation of the component are exhausted through said secondary apertures by action on said resilient reed and the moisture is evaporated at the innermost surface of said groove and at the interior surface of said reed.

9. In a variable impedance electrical component including an impedance element and means for varying the impedance of hte element; a hollow casing enclosing the impedance element and the impedance varying means comprising a cavity shaped body portion and a cover portion therefor, a primary aperture in said casing through which the impedance varying means is exteriorally extended and operated, a shallow peripheral groove in the exterior surface of said casing, a plurality of secondary apertures in said casing communicating between the interior and the exterior thereof terminating within the confines of said shallow peripheral groove, and a resilient reed coextensive with and positioned in said groove contiguous to the innermost wall of said groove overlying said secondary apertures, said resilient reed being of tetrafluoroethylene material characterized as having a broad thermal range of elasticity so as to be displaced from said secondary apertures responsive to a relative pressure thereon at its interior surface through said apertures and so as to be sealed to said second aperture responsive to a relative pressure thereon at its exterior surface, whereby moisture and air pressure accumulated in said casing as through said primary aperture and said cover portion during environmental operation of the component are exhausted through said secondary apertures by action on said resilient reed and the moisture is evaporated at the innermost surface of said groove and at the interior surface of said reed.

References Cited in the file of this patent

UNITED STATES PATENTS

| | | |
|---|---|---|
| 1,687,560 | Hilliard | Oct. 16, 1928 |
| 1,737,648 | Edsall | Dec. 3, 1929 |
| 2,537,671 | Jack et al. | Jan. 9, 1951 |